(12) United States Patent
Tsujioka et al.

(10) Patent No.: US 8,822,084 B2
(45) Date of Patent: Sep. 2, 2014

(54) ELECTROLYTE FOR NON-AQUEOUS ELECTROLYTE BATTERIES AND NON-AQUEOUS ELECTROLYTE BATTERY USING THE SAME

(75) Inventors: Shoichi Tsujioka, Iruma-gun (JP); Aiichiro Fujiwara, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 13/639,040

(22) PCT Filed: Mar. 3, 2011

(86) PCT No.: PCT/JP2011/054845
§ 371 (c)(1),
(2), (4) Date: Oct. 2, 2012

(87) PCT Pub. No.: WO2011/125397
PCT Pub. Date: Oct. 13, 2011

(65) Prior Publication Data
US 2013/0022880 A1    Jan. 24, 2013

(30) Foreign Application Priority Data

Apr. 6, 2010   (JP) .................................. 2010-087980

(51) Int. Cl.
| | | |
|---|---|---|
| *H01M 6/16* | (2006.01) | |
| *H01M 10/0568* | (2010.01) | |
| *H01M 10/052* | (2010.01) | |
| *H01G 11/64* | (2013.01) | |
| *H01M 10/0567* | (2010.01) | |
| *H01G 11/62* | (2013.01) | |
| *H01G 11/06* | (2013.01) | |

(52) U.S. Cl.
CPC ........... *H01M 10/0567* (2013.01); *H01G 11/62* (2013.01); *H01M 10/0568* (2013.01); *Y02E 60/122* (2013.01); *Y02T 10/7011* (2013.01); *H01G 11/06* (2013.01); *Y02T 10/7022* (2013.01); *H01M 10/052* (2013.01); *H01G 11/64* (2013.01); *Y02E 60/13* (2013.01)
USPC ............................ 429/308; 429/306; 429/307

(58) Field of Classification Search
None
See application file for complete search history.

(56) References Cited

U.S. PATENT DOCUMENTS

| 8,173,297 B2 | 5/2012 | Yamaguchi et al. | |
|---|---|---|---|
| 2006/0134528 A1* | 6/2006 | Ihara et al. | 429/329 |
| 2008/0138714 A1 | 6/2008 | Ihara et al. | |
| 2008/0318136 A1 | 12/2008 | Amine et al. | |

FOREIGN PATENT DOCUMENTS

| JP | 2000-123867 A | 4/2000 |
|---|---|---|
| JP | 2007-165125 A | 6/2007 |
| JP | 2008-135273 A | 6/2008 |
| JP | 2008-146983 A | 6/2008 |
| JP | 2009-129541 A | 6/2009 |
| KR | 10-2008-0018850 A | 2/2008 |
| WO | WO 2009/066559 A1 | 5/2009 |

OTHER PUBLICATIONS

International Search Report dated May 10, 2011 including English-language translation (Three (3) pages).
Japanese-language of PCT/ISA/237 dated May 10, 2011 (Three (3) pages).
Korean Office Action dated Oct. 28, 2013 (four (4) pages).
European Search Report dated Jun. 10, 2014 (Seven (7) pages).
Zhang, "A review on electrolyte additives for lithium-ion batteries," Journal of Power Sources 162 (2006) 1379-1394 (Sixteen (16) pages).

* cited by examiner

*Primary Examiner* — Milton I Cano
*Assistant Examiner* — Wojciech Haske
(74) *Attorney, Agent, or Firm* — Crowell & Moring LLP

(57) ABSTRACT

An electrolyte for a non-aqueous electrolyte battery according to the present invention contains a non-aqueous organic solvent; a solute; and both of difluorobis(oxalato)phosphate and tetrafluoro(oxalate)phosphate as additives. A non-aqueous electrolyte battery according to the present invention uses the above electrolyte. By the composite effect of the difluorobis(oxalato)phosphate and tetrafluoro(oxalate)phosphate in the non-aqueous electrolyte and the non-aqueous electrolyte battery, it is possible to improve not only the cycle characteristics and high-temperature storage stability of the battery but also the low-temperature characteristics of the battery at temperatures of 0° C. or lower.

8 Claims, No Drawings

ELECTROLYTE FOR NON-AQUEOUS ELECTROLYTE BATTERIES AND NON-AQUEOUS ELECTROLYTE BATTERY USING THE SAME

TECHNICAL FIELD

The present invention relates to an electrolyte for a non-aqueous electrolyte battery and to a non-aqueous electrolyte battery using the electrolyte.

BACKGROUND ART

In recent years, attention is given to power storage systems for small-size, high-energy-density applications such as information and communication equipment such as personal computers, video cameras, digital still cameras and mobile phones and for large-size power applications such as electric vehicles, hybrid vehicles, auxiliary power sources of fuel cell vehicles and electricity storage devices. As one such type of power storage system, non-aqueous electrolyte batteries including lithium ion batteries, lithium batteries and lithium ion capacitors have extensively been developed.

Many kinds of non-aqueous electrolyte batteries are already in practical use, but do not have satisfactory durability for various applications. There is a problem in the long-term use of the non-aqueous electrolyte batteries under high-temperature conditions for e.g. vehicle applications because the non-aqueous electrolyte batteries largely deteriorate in performance, in particular, at temperatures of 45° C. or higher. On the other hand, there is a need for the non-aqueous electrolyte batteries to operate without troubles even under low-temperature conditions such as e.g. in cold climates for vehicle applications and electricity storage applications. It is important to secure both of high-temperature performance and low-temperature performance of the non-aqueous electrolyte batteries.

The non-aqueous electrolyte battery generally utilizes, as an ion conductor, a non-aqueous electrolyte or a non-aqueous electrolyte quasi-solidified by a gelling agent. The non-aqueous electrolyte contains a single kind of aprotic solvent, or a mixed solvent of two or more kinds of aprotic solvents, selected from ethylene carbonate, propylene carbonate, dimethyl carbonate, diethyl carbonate, ethyl methyl carbonate and the like and a lithium salt such as $LiPF_6$, $LiBF_4$, $(CF_3SO_2)_2NLi$ or $(C_2F_5SO_2)_2NLi$ as a solute.

Conventionally, the optimization of various battery components has been studied as techniques for improving the cycle characteristics, high-temperature storage stability and durability of the non-aqueous electrolyte batteries. Non-aqueous electrolyte-related technologies are not an exception to such battery performance improvement technologies. There have been made proposals to use various additives for the purpose of preventing battery performance deteriorations caused by decomposition of electrolytes on active positive or negative electrode surfaces.

For example, Japanese Laid-Open Patent Publication No. 2000-123867 (Patent Document 1) proposes a technique for improving the performance of the battery by the addition of vinylene carbonate to the electrolyte. In this proposed technique, the electrode is coated with a polymer film by polymerization of the vinylene carbonate so as to prevent decomposition of the electrolyte at the electrode surface. However, the electrolyte increases in internal resistance due to the difficulty for lithium ions to pass through the polymer coating film and cannot provide a sufficient battery capacity at low temperatures of 0° C. or lower.

Japanese Laid-Open Patent Publication No. 2007-165125 (Patent Document 2) proposes a technique for improving the high-temperature cycle characteristics and output characteristics of the battery due to the formation of a coating film on the electrode interface by the addition of difluorobis(oxalato) phosphate and monofluorophosphate or difluorophosphate to the electrolyte. The effects of this proposed technique are however not yet sufficient. In addition, the thus-obtained battery does not show sufficient performance at low temperatures of 0° C. or lower.

PRIOR ART DOCUMENTS

Patent Documents

Patent Document 1: Japanese Laid-Open Patent Publication No. 2000-123867
Patent Document 2: Japanese Laid-Open Patent Publication No. 2007-165125

SUMMARY OF THE INVENTION

Problems to be Solved by the Invention

It is an object of the present invention to provide an electrolyte for a non-aqueous electrolyte battery, which is capable of improving the cycle characteristics, high-temperature storage stability and durability of the battery and allowing the battery to exhibit sufficient performance even at low temperatures of 0° C. or lower, and to provide a non-electrolyte battery using such an electrolyte.

Means for Solving the Problems

The present inventors have made extensive researches in view of the above problems and, as a result, have found that: highly lithium-ion conductive coating films can be formed by decomposition of difluorobis(oxalato)phosphate on positive and negative electrodes so as to avoid direct contact of active materials with a non-aqueous organic solvent and a solute and thereby not to cause decomposition of the non-organic aqueous solvent and the solute for prevention of battery deterioration; when tetrafluoro(oxalato)phosphate coexists and get decomposed together with difluorobis(oxalato)phosphate on the positive and negative electrodes, the decomposition products of these additives are formed into composite coating films on the respective electrodes; and the formation of such coating composite films leads to the battery durability and low-temperature characteristics that cannot be achieved by each one of these additives. The present invention is based on the above finding.

According to one aspect of the present invention, there is provided an electrolyte for a non-aqueous electrolyte battery, comprising: a non-aqueous organic solvent; a solute; and both of difluorobis(oxalato)phosphate and tetrafluoro(oxalate) phosphate as additives.

It is preferable that the difluorobis(oxalato)phosphate is contained in an amount of 0.1 to 5.0 mass % based on the total amount of the electrolyte for the non-aqueous electrolyte battery and is preferable that the tetrafluoro(oxalate)phosphate is contained in an amount of 0.01 to 1.0 mass % based on the total amount of the electrolyte for the non-aqueous electrolyte battery. It is also preferable that the difluorobis (oxalato)phosphate and the tetrafluoro(oxalate)phosphate each independently contain at least one kind of cation selected from the group consisting of lithium ion, sodium ion, potassium ion and tetraalkylammonium ion. Further, it is preferable that the solute is at least one selected from the group consisting of LiPF$_6$, LiBF$_4$, (CF$_3$SO$_2$)$_2$NLi and (C$_2$F$_5$SO$_2$)$_2$NLi.

According to another aspect of the present invention, there is provided a non-aqueous electrolyte battery, comprising at least: a positive electrode; a negative electrode containing lithium or a negative electrode material capable of absorbing and desorbing lithium ions; and the above electrolyte.

It is possible in the present invention to provide the electrolyte for the non-aqueous electrolyte battery and the non-aqueous electrolyte battery, each of which allows improvements in not only the cycle characteristics and high-temperature storage stability etc. of the battery but also in the low-temperature characteristics of the battery at 0° C. or lower.

DETAILED DESCRIPTION OF THE EMBODIMENTS

1. Electrolyte for Non-Aqueous Electrolyte Battery

An electrolyte for a non-aqueous electrolyte battery according to the present invention contains a non-aqueous organic solvent, a solute and both of difluorobis(oxalato)phosphate and tetrafluoro(oxalato)phosphate as additives. Any other commonly known additive or additives may also be contained as needed in the electrolyte.

The respective components of the electrolyte for the non-aqueous electrolyte battery according to the present invention will be described in detail below.

[Non-Aqueous Organic Solvent]

There is no particular limitation on the kind of the non-aqueous organic solvent used in the electrolyte for the non-aqueous electrolyte battery according to the present invention. Any non-aqueous organic solvent can be used. Specific examples of the non-aqueous organic solvent are: cyclic carbonates such as propylene carbonate, ethylene carbonate and butylene carbonate; chain carbonates such as diethyl carbonate, dimethyl carbonate and methyl ethyl carbonate; cyclic esters such as γ-butyrolactone and γ-valerolactone; chain esters such as methyl acetate and methyl propionate; cyclic ethers such as tetrahydrofuran, 2-methyltetrahydrofuran and dioxane; chain ethers such as dimethoxyethane and diethyl ether; and sulfur-containing non-aqueous organic solvents such as dimethyl sulfoxide and sulfolane. These non-aqueous organic solvents can used solely or in the form of a mixture of two or more kinds thereof at any appropriate ratio.

[Solute]

There is no particular limitation on the kind of the solute used in the electrolyte for the non-aqueous electrolyte battery according to the present invention. Any lithium salt can be used as the solute. Specific examples of the lithium salt used as the solute are lithium salt electrolytes such as LiPF$_6$, LiBF$_4$, LiClO$_4$, LiAsF$_6$, LiSbF$_6$, LiCF$_3$SO$_3$, LiN(SO$_2$CF$_3$)$_2$, LiN(SO$_2$C$_2$F$_5$)$_2$, LiN(SO$_2$CF$_3$)(SO$_2$C$_4$F$_9$), LiC(SO$_2$CF$_3$)$_3$, LiPF$_3$(C$_3$F$_7$)$_3$, LiB(CF$_3$)$_4$ and LiBF$_3$(C$_2$F$_5$). These solutes can be used solely or in the form of a mixture of two or more kinds thereof at any appropriate ratio. Among others, LiPF$_6$, LiBF$_4$, (CF$_3$SO$_2$)$_2$NLi or (C$_2$F$_5$SO$_2$)$_2$NLi is preferably used in terms of the battery energy density, output characteristics and life cycle.

There is also no particular limitation on the concentration of the solute in the electrolyte. The concentration of the solute is preferably 0.5 mol/L or higher, more preferably 0.7 mol/L or higher, still more preferably 0.9 mol/L or higher and, at the same time, is preferably 2.5 mol/L or lower, more preferably 2.2 mol/L or lower, still more preferably 2.0 mol/L or lower. If the concentration of the solute is lower than 0.5 mol/L, the ion conductivity of the electrolyte may decrease to cause deteriorations in the cycle characteristics and output characteristics of the non-aqueous electrolyte battery. If the concentration of the solute exceeds 2.5 mol/L, the ion conductivity of the electrolyte may decrease with increase in viscosity to cause deteriorations in the cycle characteristics and output characteristics of the non-aqueous electrolyte battery.

[Additives]

As mentioned above, both of difluorobis(oxalato)phosphate and tetrafluoro(oxalato)phosphate are contained as essential additives in the electrolyte for the non-aqueous electrolyte battery according to the present invention. The difluorobis(oxalato)phosphate has an anion moiety represented by the following chemical formula (1), whereas the tetrafluoro(oxalato)phosphate has an anion moiety represented by the following chemical formula (2).

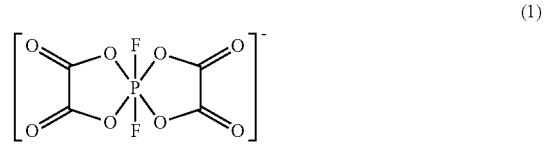

There is no particular limitation on the counter cations combined with the above respective anion moieties. Various cations can be selected and used as long as the performance of the non-aqueous electrolyte and the non-aqueous electrolyte battery according to the present invention is not impaired by the counter cations. Specific examples of the counter caions are: ions of metals such as lithium, sodium, potassium, rubidium, cesium, magnesium, calcium, barium, silver, copper and iron; and onium ions of tetraalkylammoniums, tetraalkylphosphoniums, imidazolium derivatives and the like. Among others, lithium ion, sodium ion, potassium ion or tetraalkylammonium ion is preferably used in terms of the ion conduction assistant function in the non-aqueous electrolyte battery.

The amount of the difluorobis(oxalato)phosphate contained in the electrolyte is preferably 0.1 mass % or more, more preferably 0.3 mass % or more, still more preferably 5.0 mass % or more and, at the same time, is preferably 5.0 mass % or less, more preferably 3.0 mass % or less, still more preferably 2.0 mass % or less, based on the total amount of the electrolyte for the non-aqueous electrolyte battery. If the amount of the difluorobis(oxalato)phosphate is less than 0.1 mass %, it is difficult to obtain a sufficient effect for improving the cycle characteristics, high-temperature storage stability and durability of the non-aqueous electrolyte battery. If the amount of the difluorobis(oxalato)phosphate exceeds 5.0 mass %, it becomes likely that the difluorobis(oxalato)phosphate will be consumed by not only film-forming reaction but also decomposition reaction. In this decomposition reaction, swelling or performance deterioration of the battery may be caused by gas generation.

The amount of the tetrafluoro(oxalato)phosphate contained in the electrolyte is preferably 0.01 mass % or more, more preferably 0.03 mass % or more, still more preferably 0.05 mass % or more and, at the same time, is preferably 1.0 mass % or less, more preferably 0.3 mass % or less, still more preferably 0.2 mass % or less, based on the total amount of the electrolyte for the non-aqueous electrolyte battery. If the amount of the tetrafluoro(oxalato)phosphate is less than 0.01 mass %, it may not be possible to obtain a sufficient effect for improving the low-temperature characteristics of the non-aqueous electrolyte battery. If the amount of the tetrafluoro (oxalato)phosphate exceeds 1.0 mass %, it may also not possible to obtain a sufficient effect for improving the low-temperature characteristics of the non-aqueous electrolyte battery.

The mechanism in which the battery performance, notably durability and low-temperature characteristics, can be significantly improved by the combined use of the difluorobis(oxalato)phosphate and tetrafluoro(oxalato)phosphate as the additives in the electrolyte for the non-aqueous electrolyte battery according to the present invention as compared to the use of each one of difluorobis(oxalato)phosphate and tetrafluoro(oxalato)phosphate is not apparent. In the present invention, however, coating films of these additives are formed on electrodes so as to avoid the non-aqueous electrolyte from being decomposed by reduction-oxidation and prevent deterioration of the non-aqueous electrolyte battery. The formation of such coating films makes it possible to improve the durability of the non-aqueous electrolyte battery. Further, the coexistence of two kinds of additives produces some interaction effect to form the composite coating films of these two additives as strong protection films capable of easily conducting lithium ions even under low-temperature conditions.

Although the basic components of the electrolyte for the non-aqueous electrolyte battery according to the present invention has been explained above, one kind or two or more kinds in any combination of other commonly used additives may be contained in the non-aqueous electrolyte at any appropriate ratio. Specific examples of the other additives are compounds having overcharge preventing effects, negative electrode coating effects, positive electrode protecting effects, flame retardant effects etc., such as cyclohexylbenzene, biphenyl, t-butylbenzene, vinylene carbonate, vinylethylene carbonate, difluoroanisole, fluoroethylene carbonate, propane sultone, dimethylvinylene carbonate, difluorophosphate, monofluorophosphate, phosphoric acid ester and phosphazene derivatives. In the case of using the non-aqueous electrolyte in the non-aqueous electrolyte battery called "lithium polymer battery", the non-aqueous electrolyte may be used in a quasi-solid state with the addition of a gelling agent or cross-linked polymer.

2. Non-Aqueous Electrolyte Battery

A non-aqueous electrolyte battery according to the present invention includes, in addition to the above-mentioned non-aqueous electrolyte according to the present invention, other common non-aqueous electrolyte battery components such as a positive electrode, a negative electrode, a separator and a container.

The negative electrode has at least a negative electrode material and a collector. The positive electrode has at least a positive electrode material and a collector.

The collector is in the form of a conductive sheet that enables ion transfer to and from the positive electrode material or negative electrode material. As such a collector, there can be used a metal, a carbon material or a conductive polymer. For example, it is feasible to use aluminum foil as the collector of the positive electrode and copper foil as the collector of the negative electrode.

There is no particular limitation on the negative electrode material. Examples of the negative electrode material are those capable of absorbing and desorbing lithium, such as lithium metal, alloys and intermetallic compounds of lithium and other metals, carbon materials, synthetic graphites, natural graphites, metal oxides, metal nitrides, activated carbons and conductive polymers.

There is also no particular limitation on the positive electrode material. Examples of the positive electrode material used in e.g. lithium battery or lithium ion battery are: lithium-transition metal composite oxides such as $LiCoO_2$, $LiNiO_2$, $LiMnO_2$, $LiMn_2O_4$ and a composite oxide of lithium and a plurality of transition metals, in each of which part of transition metal may be replaced with the other metal; lithium-transition metal phosphates such as $LiFePO_4$, $LiMnPO_4$ and a phosphate of lithium and a plurality of transition metals, in each of which part of transition metal may be replaced with the other metal; oxides such as $TiO_2$, $V_2O_5$ and $MoO_3$; sulfides such as $TiS_2$ and $FeS$; and conductive polymers such as polyacetylene, poly(p-phenylene), polyaniline and polypyrrole; activated carbons; polymers capable of generating radicals; and carbon materials.

A conductive agent such as Acetylene Black, Ketjen Black or carbon fibers and/or a binder such as polytetrafluoroethylene, polyvinylidene fluoride or SBR resin may be added to each of the positive electrode material and the negative electrode material for ease of forming the electrode into a sheet shape.

The separator functions to avoid contact between the positive electrode and the negative electrode. A nonwoven fabric or porous sheet of polypropylene, polyethylene, paper, glass fiber etc. can be used as the separator.

Using the above components, the non-aqueous electrolyte battery can be assembled in coin form, cylindrical form, square form or aluminum laminate sheet form.

EXAMPLES

The present invention will be described in more detail below by way of the following examples. It should be noted that the following examples are illustrative and are not intended to limit the present invention thereto.

Example 1

An electrolyte for a non-aqueous electrolyte battery was prepared by mixing $LiPF_6$ as a solute, lithium difluorobis(oxalato)phosphate and lithium tetrafluoro(oxalato)phosphate with a mixed solution of ethylene carbonate, dimethyl carbonate and ethyl methyl carbonate in a volume ratio of 1:1:1 such that the electrolyte contained 1.0 mol/L of $LiPF_6$, 0.5 mass % of lithium difluorobis(oxalato)phosphate and 0.05 mass % of lithium tetrafluoro(oxalato)phosphate.

Using this electrolyte in combination with $LiCoO_2$ as a positive electrode material and graphite as a negative electrode material, a battery cell was produced by the following procedure. A paste was prepared by mixing 90 parts by mass of $LiCoO_2$ powder, 5 parts by mass of polyvinylidene fluoride (PVDF) as a binder and 5 parts by mass of Acetylene Black as a conductive agent and adding N-methylpyrrolidone to the mixture. The prepared paste was applied to and dried on aluminum foil, thereby forming a sample positive electrode. Another paste was prepared by mixing 90 parts by mass of graphite powder and 10 parts by mass of polyvinylidene fluoride (PVDF) as a binder and adding N-methylpyrrolidone to the mixture. The prepared another paste was applied to and dried at 150° C. for 12 hours on copper foil, thereby forming a sample negative electrode. Further, a polyethylene separator was impregnated with the above-prepared electrolyte. The battery cell was assembled from these battery components in the form of a 50 mAh cell with a aluminum laminate film package.

The thus-produced battery cell was subjected to charge/discharge cycle test at an environment temperature of 60° C. In the test, each of charging and discharging was conducted with a current of 50 mA so as to test the battery cell by repeated charge/discharge cycles of charging the battery cell to 4.2 V, maintaining the battery cell at 4.2 for 1 hour and discharging the battery cell to 3.0 V. The battery cell was then evaluated for the discharge capacity retention after 500 charge/discharge cycles as well as the low-temperature characteristics after 500 charge/discharge cycles. Herein, the discharge capacity retention was determined as the percentage ratio of the discharge capacity after 500 charge/discharge cycles to the initial discharge capacity; and the low-temperature characteristics was determined as the percentage ratio of the discharge capacity at −20° C. to the discharge capacity at 25° C.

The discharge capacity retention of the battery cell after 500 charge/discharge cycles was 82%; and the low-temperature characteristics of the battery cell after 500 charge/discharge cycles was 68%.

Example 2

An electrolyte was prepared in the same manner as in Example 1, except that: lithium difluorobis(oxalato)phosphate was added in an amount of 0.1 mass % to the electrolyte; and lithium tetrafluoro(oxalato)phosphate was added in an amount of 0.01 mass % to the electrolyte. A battery cell was produced using the prepared electrolyte and subjected to charge/discharge cycle test in the same manner as in Example 1.

The discharge capacity retention of the battery cell after 500 charge/discharge cycles was 79%; and the low-temperature characteristics of the battery cell after 500 charge/discharge cycles was 64%.

Example 3

An electrolyte was prepared in the same manner as in Example 1, except that: lithium difluorobis(oxalato)phosphate was added in an amount of 3.0 mass % to the electrolyte; and lithium tetrafluoro(oxalato)phosphate was added in an amount of 0.5 mass % to the electrolyte. A battery cell was produced using the prepared electrolyte and subjected to charge/discharge cycle test in the same manner as in Example 1.

The discharge capacity retention of the battery cell after 500 charge/discharge cycles was 91%; and the low-temperature characteristics of the battery cell after 500 charge/discharge cycles was 65%.

Comparative Example 1

An electrolyte was prepared in the same manner as in Example 1, except that lithium difluorobis(oxalato)phosphate and lithium tetrafluoro(oxalato)phosphate were not added to the electrolyte. A battery cell was produced using the prepared electrolyte and subjected to charge/discharge cycle test in the same manner as in Example 1.

The discharge capacity retention of the battery cell after 500 charge/discharge cycles was 45%; and the low-temperature characteristics of the battery cell after 500 charge/discharge cycles was 7%.

Comparative Example 2

An electrolyte was prepared in the same manner as in Example 1, except that lithium tetrafluoro(oxalato)phosphate was not added to the electrolyte. A battery cell was produced using the prepared electrolyte and subjected to charge/discharge cycle test in the same manner as in Example 1.

The discharge capacity retention of the battery cell after 500 charge/discharge cycles was 72%; and the low-temperature characteristics of the battery cell after 500 charge/discharge cycles was 34%.

Comparative Example 3

An electrolyte was prepared in the same manner as in Example 1, except that lithium difluorobis(oxalato)phosphate was not added to the electrolyte. A battery cell was produced using the prepared electrolyte and subjected to charge/discharge cycle test in the same manner as in Example 1.

The discharge capacity retention of the battery cell after 500 charge/discharge cycles was 60%; and the low-temperature characteristics of the battery cell after 500 charge/discharge cycles was 26%.

Example 4

An electrolyte was prepared in the same manner as in Example 1, except that: sodium difluorobis(oxalato)phosphate was added to the electrolyte in place of lithium difluorobis(oxalato)phosphate; and triethylmethylammonium tetrafluoro(oxalato)phosphate was added in an amount of 0.02 mass % to the electrolyte in place of lithium tetrafluoro(oxalato)phosphate. A battery cell was produced using the prepared electrolyte and subjected to charge/discharge cycle test in the same manner as in Example 1.

The discharge capacity retention of the battery cell after 500 charge/discharge cycles was 84%; and the low-temperature characteristics of the battery cell after 500 charge/discharge cycles was 66%.

Comparative Example 4

An electrolyte was prepared in the same manner as in Example 1, except that: lithium difluorobis(oxalato)phosphate was not added to the electrolyte; and triethylmethylammonium tetrafluoro(oxalato)phosphate was added in an amount of 0.02 mass % to the electrolyte in place of lithium tetrafluoro(oxalato)phosphate. A battery cell was produced using the prepared electrolyte and subjected to charge/discharge cycle test in the same manner as in Example 1.

The discharge capacity retention of the battery cell after 500 charge/discharge cycles was 62%; and the low-temperature characteristics of the battery cell after 500 charge/discharge cycles was 32%.

Comparative Example 5

An electrolyte was prepared in the same manner as in Example 1, except that: sodium difluorobis(oxalato)phosphate was added to the electrolyte in place of lithium difluorobis(oxalato)phosphate; and lithium tetrafluoro(oxalato)phosphate was not added to the electrolyte. A battery cell was produced using the prepared electrolyte and subjected to charge/discharge cycle test in the same manner as in Example 1.

The discharge capacity retention of the battery cell after 500 charge/discharge cycles was 73%; and the low-temperature characteristics of the battery cell after 500 charge/discharge cycles was 38%.

Example 5

An electrolyte was prepared in the same manner as in Example 1, except that: potassium difluorobis(oxalato)phosphate was added to the electrolyte in place of lithium difluorobis(oxalato)phosphate; potassium tetrafluoro(oxalato)phosphate was added in an amount of 0.03 mass % to the electrolyte in place of lithium tetrafluoro(oxalato)phosphate; $LiBF_4$ was used as a solute; a mixed solvent of ethylene carbonate, propylene carbonate, dimethyl carbonate, diethyl carbonate in a volume ratio of 1:1:1:1 was used as a solvent. A battery cell was produced using the prepared electrolyte and subjected to charge/discharge cycle test in the same manner as in Example 1.

The discharge capacity retention of the battery cell after 500 charge/discharge cycles was 83%; and the low-temperature characteristics of the battery cell after 500 charge/discharge cycles was 66%.

Example 6

An electrolyte was prepared in the same manner as in Example 1, except that: lithium difluorobis(oxalato)phosphate was added in an amount of 1 mass % to the electrolyte; and lithium tetrafluoro(oxalato)phosphate was added in an amount of 0.15 mass % to the electrolyte. A battery cell was produced using the prepared electrolyte and subjected to charge/discharge cycle test in the same manner as in Example 1.

The discharge capacity retention of the battery cell after 500 charge/discharge cycles was 94%; and the low-temperature characteristics of the battery cell after 500 charge/discharge cycles was 70%.

Example 7

An electrolyte was prepared in the same manner as in Example 1, except that: lithium difluorobis(oxalato)phosphate was added in an amount of 1 mass % to the electrolyte; and lithium tetrafluoro(oxalato)phosphate was added in an amount of 1.5 mass % to the electrolyte. A battery cell was produced using the prepared electrolyte and subjected to charge/discharge cycle test in the same manner as in Example 1.

The discharge capacity retention of the battery cell after 500 charge/discharge cycles was 88%; and the low-temperature characteristics of the battery cell after 500 charge/discharge cycles was 48%.

Example 8

An electrolyte was prepared in the same manner as in Example 1, except that lithium difluorobis(oxalato)phosphate was added in an amount of 0.06 mass % to the electrolyte. A battery cell was produced using the prepared electrolyte and subjected to charge/discharge cycle test in the same manner as in Example 1.

The discharge capacity retention of the battery cell after 500 charge/discharge cycles was 76%; and the low-temperature characteristics of the battery cell after 500 charge/discharge cycles was 52%.

Example 9

An electrolyte was prepared in the same manner as in Example 1, except that lithium difluorobis(oxalato)phosphate was added in an amount of 4.8 mass % to the electrolyte. A battery cell was produced using the prepared electrolyte and subjected to charge/discharge cycle test in the same manner as in Example 1.

The discharge capacity retention of the battery cell after 500 charge/discharge cycles was 93%; and the low-temperature characteristics of the battery cell after 500 charge/discharge cycles was 63%.

Example 10

An electrolyte was prepared in the same manner as in Example 1, except that lithium difluorobis(oxalato)phosphate was added in an amount of 7.0 mass % to the electrolyte. A battery cell was produced using the prepared electrolyte and subjected to charge/discharge cycle test in the same manner as in Example 1.

The discharge capacity retention of the battery cell after 500 charge/discharge cycles was 78%; and the low-temperature characteristics of the battery cell after 500 charge/discharge cycles was 55%.

Example 11

An electrolyte was prepared in the same manner as in Example 4, except that triethylmethylammonium tetrafluoro(oxalato)phosphate was added in an amount of 0.006 mass % to the electrolyte. A battery cell was produced using the prepared electrolyte and subjected to charge/discharge cycle test in the same manner as in Example 1.

The discharge capacity retention of the battery cell after 500 charge/discharge cycles was 77%; and the low-temperature characteristics of the battery cell after 500 charge/discharge cycles was 56%.

Example 12

An electrolyte was prepared in the same manner as in Example 7, except that lithium tetrafluoro(oxalato)phosphate was added in an amount of 0.8 mass % to the electrolyte. A battery cell was produced using the prepared electrolyte and subjected to charge/discharge cycle test in the same manner as in Example 1.

The discharge capacity retention of the battery cell after 500 charge/discharge cycles was 91%; and the low-temperature characteristics of the battery cell after 500 charge/discharge cycles was 72%.

Example 13

An electrolyte was prepared in the same manner as in Example 1, except that vinylene carbonate was further added as an additive in an amount of 0.5 mass % to the electrolyte. A battery cell was produced using the prepared electrolyte and subjected to charge/discharge cycle test in the same manner as in Example 1.

The discharge capacity retention of the battery cell after 500 charge/discharge cycles was 87%; and the low-temperature characteristics of the battery cell after 500 charge/discharge cycles was 46%.

Comparative Example 6

An electrolyte was prepared in the same manner as in Comparative Example 1, except that vinylene carbonate was further added as an additive in an amount of 0.5 mass % to the electrolyte. A battery cell was produced using the prepared electrolyte and subjected to charge/discharge cycle test in the same manner as in Example 1.

The discharge capacity retention of the battery cell after 500 charge/discharge cycles was 62%; and the low-temperature characteristics of the battery cell after 500 charge/discharge cycles was 4%.

The above test results are summarized in TABLE 1.

TABLE 1

| | Difluorobis(oxalato)phosphate concentration (mass %) | Tetrafluoro(oxalato)phosphate concentration (mass %) |
|---|---|---|
| Example 1 | 0.5 | 0.05 |
| Example 2 | 0.1 | 0.01 |
| Example 3 | 3 | 0.5 |
| Comparative Example 1 | 0 | 0 |
| Comparative Example 2 | 0.5 | 0 |
| Comparative Example 3 | 0 | 0.05 |
| Example 4 | 0.5 | 0.02 |
| Comparative Example 4 | 0 | 0.02 |
| Comparative Example 5 | 0.5 | 0 |
| Example 5 | 0.5 | 0.03 |
| Example 6 | 1 | 0.15 |
| Example 7 | 1 | 1.5 |
| Example 8 | 0.06 | 0.05 |
| Example 9 | 4.8 | 0.05 |
| Example 10 | 7 | 0.05 |
| Example 11 | 0.5 | 0.006 |
| Example 12 | 1 | 0.8 |
| Example 13 | 0.5 | 0.05 |
| Comparative Example 6 | 0 | 0 |

| | Vinylene carbonate concentration (mass %) | Capacity retention (%) after cycle test | Low-temperature. characteristics (%) (−20° C./25° C. discharge capacity ratio) |
|---|---|---|---|
| Example 1 | 0 | 82 | 68 |
| Example 2 | 0 | 79 | 64 |
| Example 3 | 0 | 91 | 65 |
| Comparative Example 1 | 0 | 45 | 7 |
| Comparative Example 2 | 0 | 72 | 34 |
| Comparative Example 3 | 0 | 60 | 26 |
| Example 4 | 0 | 84 | 66 |
| Comparative Example 4 | 0 | 62 | 32 |
| Comparative Example 5 | 0 | 73 | 38 |
| Example 5 | 0 | 83 | 66 |
| Example 6 | 0 | 94 | 70 |
| Example 7 | 0 | 88 | 48 |
| Example 8 | 0 | 76 | 52 |
| Example 9 | 0 | 93 | 63 |
| Example 10 | 0 | 78 | 55 |
| Example 11 | 0 | 77 | 56 |
| Example 12 | 0 | 91 | 72 |
| Example 13 | 0.5 | 87 | 46 |
| Comparative Example 6 | 0.5 | 62 | 4 |

As is seen from comparison of the test results, the battery cell had better low-temperature characteristics by the combined use of difluorobis(oxalato)phosphate and tetrafluoro(oxalato)phosphate as additives in the electrolyte than by the single use of each of difluorobis(oxalato)phosphate and tetrafluoro(oxalato)phosphate.

INDUSTRIAL APPLICABILITY

The electrolyte for the non-aqueous electrolyte battery according to the present invention can suitably be used as electrolytes for non-aqueous electrolyte batteries such as lithium batteries, lithium ion batteries and lithium ion capacitors. Further, the non-aqueous electrolyte battery according the present invention can suitably be used in small-size power sources for information and communication equipment such as personal computers, video cameras, digital still cameras and mobile phones, power storage systems for high-energy-density applications, large-size power sources for electric vehicles, hybrid vehicles, auxiliary power sources of fuel cell vehicles, electricity storage devices and the like and power storage systems for power applications.

Although the present invention has been described with reference to the above embodiments, various modifications and variations of the above embodiments can be made based on the knowledge of those skilled in the art without departing from the scope of the present invention.

The invention claimed is:

1. An electrolyte for a non-aqueous electrolyte battery, comprising: a non-aqueous organic solvent; a solute; and both of difluorobis(oxalato)phosphate and tetrafluoro(oxalato) phosphate as additives,
    wherein the difluorobis(oxalato)phosphate is contained in an amount of 0.1 to 5.0 mass % based on the total amount of the electrolyte for the non-aqueous electrolyte battery;
    wherein the tetrafluoro(oxalato)phosphate is contained in an amount of 0.01 to 1.0 mass % based on the total amount of the electrolyte for the non-aqueous electrolyte battery; and
    wherein a mass ratio of the amount of the difluorobis (oxalato)phosphate and the amount of the tetrafluoro (oxalato)phosphate is between 1:1.5 and 140:1.

2. The electrolyte for the non-aqueous electrolyte battery according to claim 1, wherein the difluorobis(oxalato)phosphate and the tetrafluoro(oxalato)phosphate each independently contain at least one kind of cation selected from the group consisting of lithium ion, sodium ion, potassium ion and tetraalkylammonium ion.

3. The electrolyte for the non-aqueous electrolyte battery according to claim 1, wherein the solute is at least one selected from the group consisting of $LiPF_6$, $LiBF_4$, $(CF_3SO_2)_2NLi$ and $(C_2F_5SO_2)_2NLi$ and the non-aqueous organic solvent is at least one selected from the group consisting of propylene carbonate, ethylene carbonate, butylene carbonate, diethyl carbonate, dimethyl carbonate, methyl ethyl carbonate, γ-butyrolactone, γ-valerolactone, methyl acetate, methyl propionate, tetrahydrofuran, 2-methyltetrahydrofuran, dioxane, dimethoxyethane, diethyl ether, dimethyl sulfoxide and sulfolane.

4. A non-aqueous electrolyte battery, comprising at least: a positive electrode; a negative electrode containing lithium or a negative electrode material capable of absorbing and desorbing lithium; and the electrolyte for the non-aqueous electrolyte battery of claim 1.

5. An electrolyte for a non-aqueous electrolyte battery, comprising:
    at least one kind of non-aqueous organic solvent selected from the group consisting of ethylene carbonate, dimethyl carbonate, ethyl methyl carbonate, propylene carbonate and diethyl carbonate;

at least one kind of solute selected from the group consisting of $LiPF_6$ and $LiBF_4$; and additives including difluorobis(oxalato)phosphate and tetrafluoro(oxalato)phosphate, wherein the difluorobis(oxalato)phosphate is contained in an amount of 0.1 to 5.0 mass % based on the total amount of the electrolyte for the non-aqueous electrolyte battery; and wherein the tetrafluoro(oxalato)phosphate is contained in an amount of 0.01 to 1.0 mass % based on the total amount of the electrolyte for the non-aqueous electrolyte battery.

6. The electrolyte for the non-aqueous electrolyte battery according to claim 5, wherein the difluorobis(oxalato)phosphate and the tetrafluoro(oxalato)phosphate each independently contain at least one kind of cation selected from the group consisting of lithium ion, sodium ion, potassium ion and tetraalkylammonium ion.

7. The electrolyte for the non-aqueous electrolyte battery according to claim 5, wherein the at least one kind of non-aqueous organic solvent is a mixed solvent of ethylene carbonate, dimethyl carbonate and ethyl methyl carbonate or a mixed solvent of ethylene carbonate, propylene carbonate, dimethyl carbonate and diethyl carbonate.

8. A non-aqueous electrolyte battery, comprising at least: a positive electrode; a negative electrode containing lithium or a negative electrode material capable of absorbing and desorbing lithium; and the electrolyte for the non-aqueous electrolyte battery of claim 5.

* * * * *